US011762720B2

(12) United States Patent
Omishima

(10) Patent No.: US 11,762,720 B2
(45) Date of Patent: Sep. 19, 2023

(54) INFORMATION PROCESSING APPARATUS AND NON-TRANSITORY COMPUTER-READABLE STORAGE MEDIUM FOR STORING API USE HISTORY DISPLAY PROGRAM

(71) Applicant: FUJITSU LIMITED, Kawasaki (JP)

(72) Inventor: Senchi Omishima, Kokubunji (JP)

(73) Assignee: FUJITSU LIMITED, Kawasaki (JP)

( * ) Notice: Subject to any disclaimer, the term of this patent is extended or adjusted under 35 U.S.C. 154(b) by 109 days.

(21) Appl. No.: 17/471,214

(22) Filed: Sep. 10, 2021

(65) Prior Publication Data

US 2021/0406104 A1    Dec. 30, 2021

Related U.S. Application Data

(63) Continuation of application No. PCT/JP2019/014458, filed on Apr. 1, 2019.

(51) Int. Cl.
G06F 9/54 (2006.01)
G06F 3/14 (2006.01)
G06T 11/20 (2006.01)

(52) U.S. Cl.
CPC ............... G06F 9/547 (2013.01); G06F 3/14 (2013.01); G06T 11/206 (2013.01)

(58) Field of Classification Search
CPC ........... G06F 9/547; G06F 3/14; G06T 11/206
See application file for complete search history.

(56) References Cited

U.S. PATENT DOCUMENTS

2015/0121401 A1\* 4/2015 Laredo ...................... G06F 9/54
  719/328
2017/0262628 A1    9/2017 Kimura

FOREIGN PATENT DOCUMENTS

| EP | 2508997 A1 | 10/2012 |
|----|------------|---------|
| JP | 2000-330821 A | 11/2000 |
| JP | 2011-242891 A | 12/2011 |
| JP | 2015-106268 A | 6/2015 |
| JP | 2017-162312 A | 9/2017 |

(Continued)

OTHER PUBLICATIONS

Japanese Office Action dated Jul. 5, 2022 for corresponding Japanese Patent Application No. 2021-511802, with English Translation, 6 pages. \*\*\*Please note JP-2011-242891-A and JP-2000-330821-A cited herewith, were previously cited in an IDS filed on Sep. 10, 2021.\*\*\*.

(Continued)

Primary Examiner — Michelle L Sams
(74) Attorney, Agent, or Firm — Fujitsu Patent Center

(57) ABSTRACT

An information processing apparatus including: a memory; and a processor coupled to the memory, the processor being configured to perform processing, the processing including: executing a display form determination processing that includes extracting, from use history data of a computer service that uses a plurality of application programming interfaces (APIs), the numbers of times of execution of the APIs, and determining display forms for the APIs according to the numbers of times of execution of the APIs; and executing a display control processing that includes displaying, in a directed graph that represents a node that corresponds to each of the plurality of APIs, the nodes that correspond to the APIs in the determined display forms.

8 Claims, 9 Drawing Sheets

(56) References Cited

FOREIGN PATENT DOCUMENTS

JP       2017-228257 A    12/2017
JP       2018-147350 A     9/2018

OTHER PUBLICATIONS

International Search Report and Written Opinion of the International Searching Authority (Form PCT/ISA/210, 220, and 237), mailed in connection with PCT/JP2019/014458 and dated Jun. 25, 2019 (Total 12 pages).
Extended European Search Report dated Mar. 14, 2022 for corresponding European Patent Application No. 19923619.1, 7 pages. *Please note US-2017/0262628-A1 cited herewith, was previously cited in an IDS filed on Sep. 10, 2021.*.
European Office Action dated Apr. 21, 2023 for corresponding European Patent Application No. 19923619.1, 5 pages. *Please note EP-2508997-A1 and JP-2000-330821-A cited herewith, were previously cited in an IDS filed on Mar. 29, 2022 and Sep. 10, 2021.*.

* cited by examiner

FIG. 3
(API_A)
| ID OF SERVICE USER WHO USED API | USE TIME |
|---|---|
| 001 | 02/13/2019 12:00 |
| 001 | 02/13/2019 12:15 |
| 002 | 02/13/2019 12:30 |
| 003 | 02/13/2019 13:00 |
(API_B)
| ID OF SERVICE USER WHO USED API | USE TIME |
|---|---|
| 003 | 02/13/2019 11:45 |
| 001 | 02/13/2019 12:05 |
| 002 | 02/13/2019 12:35 |
| 004 | 02/13/2019 12:40 |
(API_C)
| ID OF SERVICE USER WHO USED API | USE TIME |
|---|---|
| 002 | 02/13/2019 11:30 |
| 001 | 02/13/2019 12:10 |
| 003 | 02/13/2019 13:05 |
| 003 | 02/13/2019 13:20 |

FIG. 4

SERVICE USER ID: 001

| API USED | USE TIME |
|---|---|
| API_A | 02/13/2019 12:00 |
| API_B | 02/13/2019 12:05 |
| API_C | 02/13/2019 12:10 |
| API_A | 02/13/2019 12:15 |

P4

} 5 MINUTES
} 5 MINUTES
} 5 MINUTES

SERVICE USER ID : 002

| API USED | USE TIME |
|---|---|
| API_C | 02/13/2019 11:30 |
| API_A | 02/13/2019 12:30 |
| API_B | 02/13/2019 12:35 |

P5

} 60 MINUTES

SERVICE USER ID : 003

| API USED | USE TIME |
|---|---|
| API_B | 02/13/2019 11:45 |
| API_A | 02/13/2019 13:00 |
| API_C | 02/13/2019 13:05 |
| API_C | 02/13/2019 13:20 |

P6

} 75 MINUTES

SERVICE USER ID : 004

| API USED | USE TIME |
|---|---|
| API_B | 02/13/2019 12:40 |

SERVICE USER ID : 001

| START POINT/ END POINT | A | B | C |
|---|---|---|---|
| A | 0 | 1 | 0 |
| B | 0 | 0 | 1 |
| C | 1 | 0 | 0 |

P8

SERVICE USER ID : 002

| START POINT/ END POINT | A | B | C |
|---|---|---|---|
| A | 0 | 1 | 0 |
| B | 0 | 0 | 0 |
| C | 0 | 0 | 0 |

P9

SERVICE USER ID : 003

| START POINT/ END POINT | A | B | C |
|---|---|---|---|
| A | 0 | 0 | 1 |
| B | 0 | 0 | 0 |
| C | 0 | 0 | 1 |

P10

SERVICE USER ID : 004

| START POINT/ END POINT | A | B | C |
|---|---|---|---|
| A | 0 | 0 | 0 |
| B | 0 | 0 | 0 |
| C | 0 | 0 | 0 |

SERVICE USER ID: * (ALL SERVICE USERS)

| START POINT/END POINT | A | B | C |
|---|---|---|---|
| A | 0 | 2 | 1 |
| B | 0 | 0 | 1 |
| C | 1 | 0 | 1 |

INFORMATION PROCESSING APPARATUS AND NON-TRANSITORY COMPUTER-READABLE STORAGE MEDIUM FOR STORING API USE HISTORY DISPLAY PROGRAM

CROSS-REFERENCE TO RELATED APPLICATION

This application is a continuation application of International Application PCT/JP2019/014458 filed on Apr. 1, 2019 and designated the U.S., the entire contents of which are incorporated herein by reference.

TECHNICAL FIELD

The present invention relates to an information processing apparatus and a non-transitory computer-readable storage medium storing an API use history display program.

BACKGROUND ART

In recent years, a computer service including a plurality of software components linked by using an application programming interface (API) has been implemented. In addition, a wide variety of APIs are provided.

FIG. 9 is a diagram illustrating a configuration of a computer system configured by using an API.

In an example illustrated in FIG. 9, a computer system 500 connected to each of a settlement system, a communication/short message service (SMS) system, and a map system via an API is indicated.

The computer system 500 may, for example, call a map function of the map system via the API for the map system and use the map function provided by the map system via the API.

System administrators want to grasp use states of a plurality of APIs.

Conventionally, a use history, for example, the number of times of use and date and time of use, of an API is managed by viewing individual log data.

Examples of the related art include as follows: Japanese Laid-open Patent Publication No. 2015-106268; Japanese Laid-open Patent Publication No. 2017-228257; and Japanese Laid-open Patent Publication No. 2018-147350.

SUMMARY OF INVENTION

According to an aspect of the embodiments, there is provided an information processing apparatus including: a memory; and a processor coupled to the memory, the processor being configured to perform processing. In an example, the processing includes: executing a display form determination processing that includes extracting, from use history data of a computer service that uses a plurality of application programming interfaces (APIs), the numbers of times of execution of the APIs, and determining display forms for the APIs according to the numbers of times of execution of the APIs; and executing a display control processing that includes displaying, in a directed graph that represents a node that corresponds to each of the plurality of APIs, the nodes that correspond to the APIs in the determined display forms.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating records in tables managed by a log management database of the computer system as an example of the embodiment;

FIG. 4 is a diagram for describing an analysis method by a log analysis unit of the computer system as an example of the embodiment;

FIG. 5 is a diagram illustrating a method of managing the number of occurrences of each API call pattern by the log analysis unit of the computer system as an example of the embodiment;

FIG. 6 is a diagram illustrating the method of managing the number of occurrences of each API call pattern by the log analysis unit of the computer system as an example of the embodiment;

DESCRIPTION OF EMBODIMENTS

Figure 1:
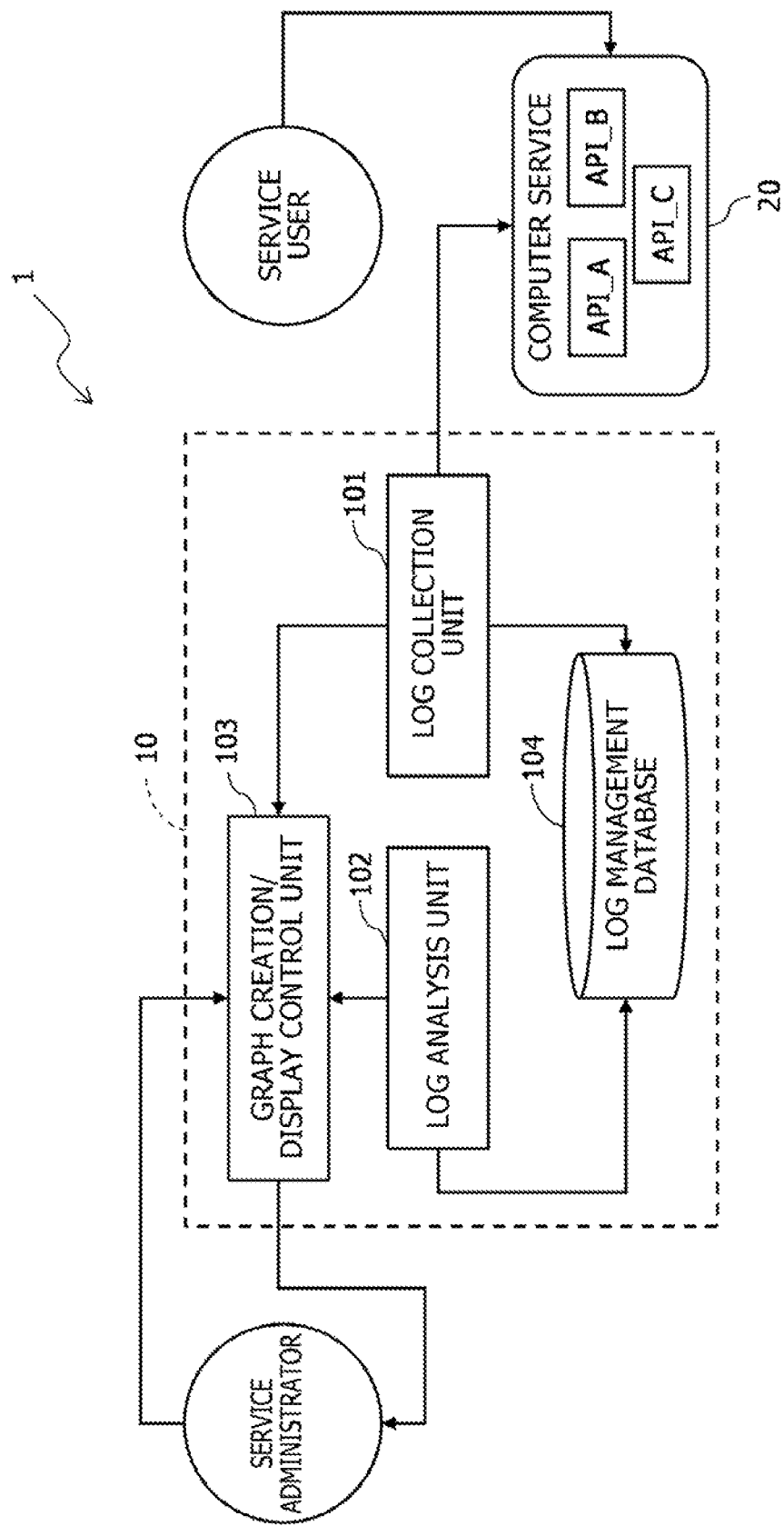
FIG. 1 is a diagram schematically illustrating a configuration of a computer system as an example of an embodiment.

However, such a conventional API management method has a problem that it is not convenient because it is not possible to grasp how the API was used, whether it was actually useful, and the like.

In one aspect, it is an object of the present invention to make it easy to grasp use states of APIs.

Hereinafter, an embodiment relating to this information processing apparatus and API use history display program will be described with reference to the drawings. Note that the embodiment to be described below is merely an example, and there is no intention to exclude application of various modifications and techniques not explicitly described in the embodiment. For example, the present embodiment may be variously modified and implemented without departing from the scope of the gist thereof. Furthermore, each drawing is not intended to include only components illustrated in the drawings, and may include another function and the like.

(A) Configuration

Figure 2:
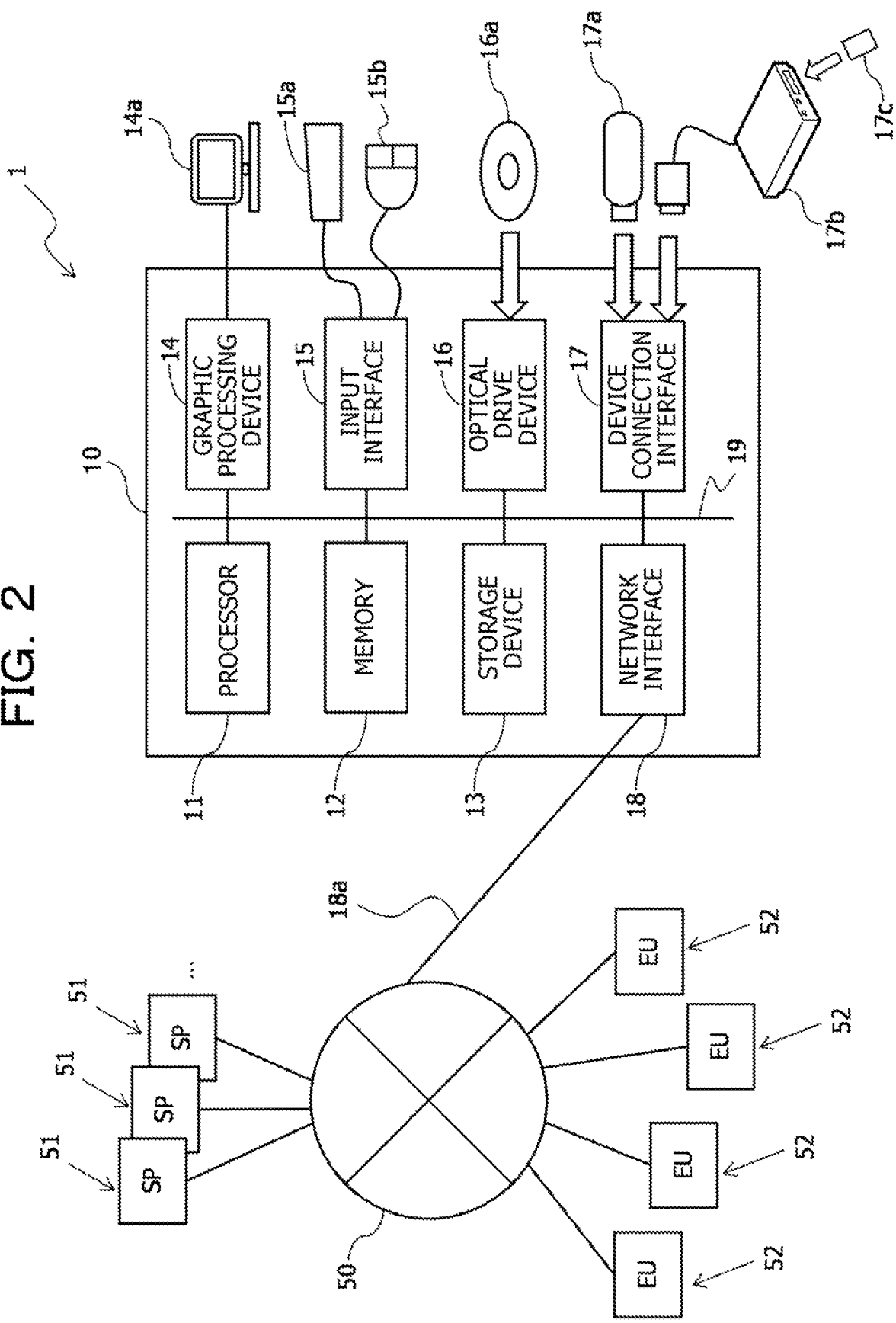
FIG. 2 is a diagram illustrating a hardware configuration of the computer system as an example of the embodiment.

FIG. 1 is a diagram schematically illustrating a configuration of a computer system 1 as an example of the embodiment, and FIG. 2 is a diagram illustrating a hardware configuration thereof. FIG. 2 mainly illustrates a hardware configuration of a management device 10 in detail.

As illustrated in FIG. 1, the computer system 1 includes the management device 10 and a computer service 20.

The computer service 20 is a service used by a service user (end user), and is configured by combining a plurality of types of application programs (hereinafter, simply referred to as applications). Hereinafter, the computer service 20 may be simply referred to as the service 20.

In the service 20, an API is provided for each application, and in order to cause an application to execute processing (function), the processing of the application is called via the API. In FIG. 1, three APIs of API_A, API_B, and API_C are illustrated.

Furthermore, applications are linked also via the APIs. For example, an API of one application calls an API of another application, and the called API executes another program. Furthermore, in a case where data is transferred from one application to another application, the data is transferred via APIs of these applications.

As illustrated in FIG. 2, the management device 10 is connected to a network 50 via a network 18*a*. To the network 50, one or more service providing servers 51 and one or more user terminals 52 are connected. The user terminal 52 may be referred to as EU 52.

The service providing server 51 is an information processing apparatus (computer) having a server function, and provides an application that implements various functions and an API provided corresponding to the application. Furthermore, the service providing server 51 may provide an API corresponding to an application other than the application provided by itself. The service providing server 51 may be referred to as SP 51. The service 20 is provided by the service providing server 51. A plurality of service providing servers 51 may cooperate to provide the service 20.

The service providing server 51 may be, for example, a virtual server virtually provided on the network 50 in a cloud computing system.

In the service providing server 51, logs are collected along with execution of an application or an API, and are stored as use history data regarding use of the service 20 by a service user.

The use history data includes, for example, information regarding time when an API was executed and identification information (service user ID) for specifying a service user who used the API. These pieces of information indicating a use history of the API are stored in a storage device (not illustrated) of the service providing server 51 as an API use history log.

In this computer system 1, as described later, it is needed to specify a service user who used the API when a log analysis unit 102 of the management device 10 analyzes the API use history log, and thus, a service user identification (ID), which is identification information that may uniquely identify a service user, is set in advance for each service user.

In this computer system 1, for example, at the start of using the service 20, a service user is made to input a service user ID on a login screen (not illustrated). With this configuration, when the service 20 is used, a service user who used the API may be specified and collected as a use history log by a log collection unit 101 described later.

Each API constituting the service 20 has a function of recording information regarding a service user ID of a service user who used the API and use time as a use history log in a predetermined storage area (not illustrated) managed by the service 20. As described above, the storage area that records the use history log may be the storage device of the service providing server 51 that provides the service 20.

The user terminal 52 is an information processing apparatus (computer) used by a service user. The service user uses the service 20 by using the user terminal 52.

The management device 10 manages an API used in the service 20.

The management device 10 is, for example, an information processing apparatus (computer) having a server function.

The hardware configuration of the management device 10 of the computer system 1 as an example of the embodiment will be described with reference to FIG. 2.

The management device 10 includes, for example, a processor 11, a memory 12, a storage device 13, a graphic processing device 14, an input interface 15, an optical drive device 16, a device connection interface 17, and a network interface 18 as components. These components 11 to 18 are configured to be communicable with each other via a bus 19.

The processor (processing unit) 11 controls the entire management device 10. The processor 11 may be a multi-processor. The processor 11 may be, for example, any one of a central processing unit (CPU), a micro processing unit (MPU), a digital signal processor (DSP), an application specific integrated circuit (ASIC), a programmable logic device (PLO), and a field programmable gate array (FPGA). Furthermore, the processor 11 may be a combination of two or more types of elements of the CPU, MPU, DSP, ASIC, PLO, and FPGA.

Then, when the processor 11 executes an API use history display program (not illustrated), functions as the log collection unit 101, the log analysis unit 102, a graph creation/display control unit 103, and a log management database 104 illustrated in FIG. 1 are implemented. The functions as the log collection unit 101, the log analysis unit 102, and the graph creation/display control unit 103 may be, for example, implemented as functions that operate on an operating system (OS) program or implemented as functions of the OS program.

Note that the management device 10 implements the functions as the log collection unit 101, the log analysis unit 102, the graph creation/display control unit 103, and the log management database 104 by executing, for example, a program (API use history display program or OS program) recorded in a computer-readable non-transitory recording medium.

A program in which processing content to be executed by the management device 10 is described may be recorded in various recording media. For example, programs to be executed by the management device 10 may be stored in the storage device 13. The processor 11 loads at least a part of the programs in the storage device 13 on the memory (RAM) 12 and executes the loaded program.

Furthermore, a program to be executed by the management device 10 (processor 11) may also be recorded in a non-transitory portable recording medium such as an optical disk 16*a*, a memory device 17*a*, or a memory card 17*c*. The program stored in the portable recording medium may be executed after being installed in the storage device 13, for example, by control from the processor 11. Furthermore, the processor 11 may directly read and execute the program from the portable recording medium.

The memory 12 is a storage memory including a read only memory (ROM) and a random access memory (RAM). The RAM of the memory 12 is used as a main storage device of the management device 10. The RAM temporarily stores at least a part of OS programs and control programs to be executed by the processor 11. Furthermore, the memory 12 stores various types of data needed for processing by the processor 11.

The storage device 13 is a storage device such as a hard disk drive (HDD), a solid state drive (SSD), or a storage class memory (SCM), and stores various types of data. The storage device 13 is used as an auxiliary storage device of the management device 10. The storage device 13 stores an OS program, a control program, and various types of data. The control program includes the API use history display program.

Note that a semiconductor storage device such as an SCM or a flash memory may be used as the auxiliary storage device. Furthermore, redundant arrays of inexpensive disks (RAID) may be configured by using plurality of storage devices 13.

Furthermore, the storage device 13 stores data constituting the log management database 104 described later.

The graphic processing device 14 is connected to a monitor 14a. The graphic processing device 14 displays an image on a screen of the monitor 14a according to a command from the processor 11. Examples of the monitor 14a include a display device using a cathode ray tube (CRT) and a liquid crystal display device. An output screen 200 (see FIG. 7) described later is displayed (output) on the monitor 14a.

The input interface 15 is connected to a keyboard 15a and a mouse 15b. The input interface 15 transmits signals sent from the keyboard 15a and the mouse 15b to the processor 11. Note that the mouse 15b is an example of a pointing device, and another pointing device may also be used. Examples of the another pointing device include a touch panel, a tablet, a touch pad, and a track ball.

The optical drive device 16 reads data recorded on the optical disk 16a by using laser light or the like. The optical disk 16a is a non-transitory portable recording medium having data recorded in a readable manner by reflection of light. Examples of the optical disk 16a include a digital versatile disc (DVD), a DVD-RAM, a compact disc read only memory (CD-ROM), and a CD-recordable (R)/rewritable (RW).

The device connection interface 17 is a communication interface for connecting a peripheral device to the management device 10. For example, the device connection interface 17 may be connected to the memory device 17a or a memory reader/writer 17b. The memory device 17a is a non-transitory recording medium having a communication function with the device connection interface 17, and is, for example, a universal serial bus (USB) memory. The memory reader/writer 17b writes data to the memory card 17c or reads data from the memory card 17c. The memory card 17c is a card-type non-transitory recording medium.

The network interface 18 is connected to the network 18a. The network interface 18 exchanges data with the service 20 (service providing servers 51) via the network 18a. Another information processing apparatus, communication device, or the like may be connected to the network 18a.

The service providing servers 51 that provide the service 20 are connected to the network 18a, and the management device 10 is communicably connected to the service providing servers 51 via the network interface 18 and the network 18a.

The management device 10 is operated by a service administrator. The service administrator inputs information regarding APIs constituting the service 20 to the graph creation/display control unit 103 described later. Thus, it is desirable that the service administrator has certain knowledge about a development cost and quality of each API as well as a relationship between a plurality of APIs constituting the service 20.

Furthermore, the service administrator confirms a result displayed by the graph creation/display control unit 103, and considers future improvement of the service.

The log collection unit 101 collects an API use history log from each API constituting the service 20. The log collection unit 101 collects the API use history logs from the service providing servers 51. The API use history logs may be collected regularly or at any time. The log collection unit 101 extracts information needed for analysis by the log analysis unit 102 described later, and stores the information in a corresponding table of the log management database 104.

Furthermore, the log collection unit 101 acquires information regarding the APIs constituting the service 20 in advance from the graph creation/display control unit 103 described later.

The log management database 104 stores data (use history log) collected and extracted by the log collection unit 101.

FIG. 3 is a diagram illustrating records in tables managed by the log management database 104 of the computer system 1 as an example of the embodiment.

FIG. 3 illustrates an example in which the log management database 104 manages data in a table format, but the present embodiment is not limited to this, and may be variously modified to be implemented.

For example, the log management database 104 includes a table for each API.

In the example illustrated in FIG. 3, a reference sign P1 indicates a use history log related to the API_A, a reference sign P2 indicates a use history log related to the API_B, and a reference sign P3 indicates a use history log related to the API_C.

The tables of the log management database 104 illustrated in FIG. 3 are configured by associating an ID of a service user who used the API with use time.

For example, in a first entry of the table indicated by the reference sign P1 in FIG. 3, it is indicated that a service user whose service user ID is "001" used the API_A at 12:00 on Feb. 13, 2019.

The log collection unit 101 extracts the service user ID and the time when the service user used the API from the use history log of each API, and stores these pieces of information in the table of the corresponding API of the log management database 104.

The log analysis unit 102 analyzes use states of the APIs by using records in the tables of the log management database 104.

[Analysis of API Use Frequency by Service User]

The log analysis unit 102 analyzes the number of times of use of an API (API use frequency) by a service user for each API.

The log analysis unit 102 acquires the number of records (cumulative number of times of use of the API by all service users) from each table prepared for each API of the log management database 104.

For example, in FIG. 3, the number of records in each of the tables indicated by the reference signs P1 to P3 is 4. The log analysis unit 102 obtains, as a first analysis result, "4" as an API use frequency of each of these API_A, API_B, and API_C.

The log analysis unit 102 determines, according to magnitude of the number of records for each API, for example, the API use frequency, the size (node size) of a node 201 representing the API on the output screen 200 (see FIG. 7) to be displayed on the monitor 14a by the graph creation/display control unit 103 described later.

The log analysis unit 102 determines, for the API, a larger node size as the API use frequency increases, and determines a smaller node size as the API use frequency decreases.

The log analysis unit 102 outputs (provides notification of) node size information indicating the determined node size of each API to the graph creation/display control unit 103. The log analysis unit 102 notifies the graph creation/display control unit 103 of the node size information together with information for specifying the API (API identification information) represented by the node size.

The log analysis unit 102 corresponds to a display form determination unit that extracts the numbers of times of execution of the APIs from the plurality of API use history logs, and determines, according to the numbers of times of execution of the APIs, display forms (node sizes) of the nodes 201 corresponding to the APIs in a directed graph of the output screen 200.

[Analysis of Use Order of APIs by Service User]

Furthermore, the log analysis unit 102 analyzes order in which a service user used APIs.

The order in which the APIs were used is performed according to the following processing 1 to 3.

(1) Processing 1

The log analysis unit 102 groups, for each service user, records stored in a table prepared for each API of the log management database 104, and arranges the records in chronological order.

FIG. 4 is a diagram for describing an analysis method by the log analysis unit 102 of the computer system 1 as an example of the embodiment.

In FIG. 4, API use history logs by the service users illustrated in FIG. 3 are grouped for each service user, further arranged in chronological order, and represented in tables.

Note that, in FIG. 4, the use history log for each API is represented in a table format, hut the present embodiment is not limited to this, and may be variously modified to be implemented.

In the example illustrated in FIG. 4, a reference sign P4 indicates a use history log of the service user whose service user ID is "001". Similarly, a reference sign P5 indicates a use history log of a service user whose service user ID is "002", a reference sign P6 indicates a use history log of a service user whose service user ID is "003", and a reference sign P7 indicates a use history log of a service user whose service user ID is "004".

The tables of the use history logs illustrated in FIG. 4 are configured by associating an API used with use time.

For example, in the table related to the service user whose se e user ID is "001", which is indicated by the reference sign P4 in FIG. 4, it is indicated that the AKA was used at 12:00 on Feb. 13, 2019. Furthermore, in this table, it is indicated that, thereafter, the API_B was used at 12:05 on Feb. 13, 2019, the API_C was used at 12:10 on Feb. 13, 2019, and, further thereafter, the API_A was used at 12:15 on Feb. 13, 2019.

Thus, it may be seen that the service user whose service user ID is "001" used the APIs in the order of the API_A, API_B, API_C, and API_A.

Furthermore, in the table indicated by the reference sign P4 in FIG. 4, it may be seen that the use time in each entry changes at 5-minute intervals.

In a case where elapsed time from use time in a previous entry to use time in a subsequent entry is within a predetermined threshold T (for example, T=30 minutes) in a plurality of entries arranged in chronological order, the log analysis unit 102 determines that these entries are processed continuously as a series of processing (there is continuity).

On the other hand, in a case where elapsed time from use time in the previous entry to the use time in the subsequent entry is greater than the predetermined threshold T (for example, T=30 minutes), the log analysis unit 102 determines that these entries (APIs) are not used continuously as a series of processing.

For example, in the table related to the service user whose service user ID is "002", which is indicated by the reference sign P5 in FIG. 4, it may be seen that the service user whose service user ID is "002" used the APIs in the order of the API_C, API_A and API_B.

Here, the API_A was used at 12:30 on Feb. 13, 2019 after the API_C was used at 11:30 on Feb. 13, 2019. For example, the service user whose service user ID is "002" used the API_A 60 minutes after using the APIS. In this case, elapsed time (60 minutes) from the use time in the previous entry to the use time in the subsequent entry is greater than the threshold T (T=30 minutes). Thus, the log analysis unit 102 determines that the use of these APIs is not used continuously (there is no continuity).

Furthermore, in the table related to the service user whose service user ID is "003", which is indicated by the reference sign P6 in FIG. 4, 75 minutes have passed between use time of the API_B and use time of the AKA thereafter. Therefore, the log analysis unit 102 determines that the use of these APIs is also not continuous (there is no continuity).

Note that the threshold T is not limited to 30 minutes, and may be appropriately changed and set. In order to set the threshold T, it is desirable that a service administrator estimates average service stay time of a service user and inputs a value greater than the estimated value as the threshold T in advance to the log analysis unit 102. The estimation of the average service stay time of a service user may be implemented by a known method such as referring to past actual values, for example, and description thereof will be omitted.

(2) Processing 2

Next, the log analysis unit 102 obtains, for each of record groups grouped for each service user in the processing 1 described above, the number of occurrences of each of API call patterns (execution order patterns) recognized to have continuity, on the basis of the use order of the APIs. Note that the use order of the APIs is assumed to be synonymous with execution order of the APIs.

Here, the API call pattern is a combination of two APIs used continuously and is execution order of two APIs executed continuously. The API call pattern represents transition of the API used. Here, in the combination of the two APIs used continuously, the API used first may be referred to as a start point, and the API used later may be referred to as an end point. The API call pattern has the start point and the end point.

In the API use history log for each service user arranged in chronological order, the log analysis unit 102 extracts (divides) a combination of two continuous APIs recognized to have continuity in use of the APIs (call pattern or execution order pattern) as one unit, and counts the number of occurrences of each combination.

For example, in the table related to the service user whose service user ID is "001", which is indicated by the reference sign P4 in FIG. 4, the service user uses the APIs in the order of the API_A, API_B, API_C, and API_A. Such use order includes three call patterns of API_A→API_B, API_B→API_C, and API_C→API_A. The number of occurrences of each of these call patterns is 1.

FIG. 5 is a diagram illustrating a method of managing the number of occurrences of each API call pattern by the log analysis unit 102 of the computer system 1 as an example of the embodiment.

Hereinafter, the API_A, API_B, and API_C may be represented by A, B, and C, respectively.

In the example illustrated in FIG. 5, a matrix in which the APIs (API_A, API_B, and API_C) that are the starting points are arranged in columns and the APIs (API_A, API_B, and API_C) that are the ending points are arranged in rows is indicated for each service user. In addition, the number of occurrences of the API call pattern is set at a corresponding position in the matrix.

Note that, in FIG. 5, the combinations of the APIs, which constitute the call patterns, are represented in a matrix format, but the present embodiment is not limited to this, and may be variously modified to be implemented.

In the example illustrated in FIG. 5, a reference sign P8 indicates the number of occurrences of the API call pattern in the use history log of the service user whose service user ID is "001". Similarly, a reference sign P9 indicates the number of occurrences of the API call pattern in the use history log of the service user whose service user ID is "002". Furthermore, a reference sign P10 indicates the number of occurrences of the API call pattern in the use history log of the service user whose service user ID is "003", and a reference sign P11 indicates the number of occurrences of the API call pattern in the use history log of the service user whose service user ID is "004". The matrices of the respective service users mutually have the same format.

As described above, the table related to the service user whose service user ID is "001", which is indicated by the reference sign P4 in FIG. 4, includes three call patterns of API_A→API_B, API_B→API_C, and API_C→API_A. For example, the number of occurrences of each of the three call patterns of a start point A to end point B, a start point B to end point C, and a start point C to end point A is 1.

Thus, in the matrix indicated by the reference sign P8 in FIG. 5, the number of occurrences of 1 is set at each position of the start point A to end point B, the start point B to end point C, and the start point C to end point A.

In this way, the log analysis unit 102 uses a combination of two APIs that are continuously executed (used) (call pattern) as one unit to extract a part of use order of the APIs that is recognized to have continuity, and counts the number of occurrences of each combination.

Furthermore, as described above, the log analysis unit 102 obtains the number of occurrences of each of the API call patterns recognized to have continuity. Thus, in a case where the elapsed time (60 minutes) from the use time in the previous entry to the use time in the subsequent entry is greater than the threshold T (for example, T=30 minutes), the log analysis unit 102 does not (exceptionally) include the use of these APIs in the count.

The table related to the service user whose service user ID is "003", which is indicated by the reference sign P6 in FIG. 4, includes three call patterns of API_B→API_A, API_A→API_C, and API_C→API_C. However, for the call pattern of API_B→API_A, elapsed time (75 minutes) from use time of the API_B to use time of the subsequent AKA is greater than the threshold T (for example, T=30 minutes). Thus, the log analysis unit 102 does not include this call pattern in the count.

Thus, in the matrix indicated by the reference sign P10 in FIG. 5, the number of occurrences of 1 is set at each position of a start point A to end point C and a start point C to end point C.

(3) Processing 3

The log analysis unit 102 adds up the matrices created for the respective service users in the processing 2. Thus, the log analysis unit 102 obtains the total number of occurrences (number of calls) of each of the API call patterns recognized to have continuity for all service users.

For example, the log analysis unit 102 obtains the number of times of execution of two APIs executed continuously in the execution order.

FIG. 6 is a diagram illustrating the method of managing the number of occurrences of each API call pattern by the log analysis unit 102 of the computer system 1 as an example of the embodiment, and indicates the total number of occurrences for all service users.

In a matrix illustrated in FIG. 6, it may be seen that the number of occurrences (number of calls) of the call pattern of the start point A to end point B, for example, the pattern in which the API_B is called next to the API_A, is the largest.

The log analysis unit 102 determines a display form of a corresponding edge 202 on a directed graph on the output screen 200 (described later by using FIG. 7) to be displayed by the graph creation/display control unit 103 according to the size of each element of the matrices that are added up, and output the display form to the graph creation/display control unit 103.

The log analysis unit 102 determines a line type of the edge 202 according to the number of calls between the APIs having continuity analyzed as described above. For example, the log analysis unit 102 thickens a line of the edge 202 as the number of calls of the call pattern increases.

The log analysis unit 102 outputs (provides notification of) information indicating the line type (line type information) of the determined edge 202 to the graph creation/display control unit 103. The log analysis unit 102 notifies the graph creation/display control unit 103 of the line type information of the edge 202 together with information for specifying the edge 202 represented by the line type information (for example, API identification information of APIs that are a start point and an end point of the edge 202).

The log analysis unit 102 corresponds to the display form determination unit that determines, on the basis of the API use history log, a display form (line type) of the edge 202 that connects between two nodes 201 corresponding to two APIs in a directed graph of the output screen 200 according to the number of times of execution of the two APIs continuously executed in the execution order among a plurality of APIs.

The graph creation/display control unit 103 generates a display screen to be displayed on the monitor 14a.

The graph creation/display control unit 103 generates a display screen to be provided to a service administrator, and displays the display screen on the monitor 14a via the graphic processing device 14.

The display screen generated by the graph creation/display control unit 103 may include an input screen for the service administrator to perform an input operation and an output screen for outputting a log analysis result by the log analysis unit 102.

The input screen generated by the graph creation/display control unit 103 has a graphical user interface (GUI), and the service administrator performs the input operation via the GUI. The service administrator inputs, for example, information regarding APIs constituting the service 20.

The service administrator inputs the information regarding the APIs in a format of, for example, a directed graph with nodes and edges (sides and branches).

The information regarding the APIs includes, for example, names of the APIs, quality of the APIs, development costs of the APIs, and presence or absence of relevance between the APIs. The input information regarding the APIs is used to generate the output screen 200 illustrated in FIG. 7.

Note that the quality of the API may be represented by, for example, the number of error occurrences (error occurrence rate) in the API. Furthermore, the development cost of the API may be represented by an amount of money or work man-hours.

Figure 7:
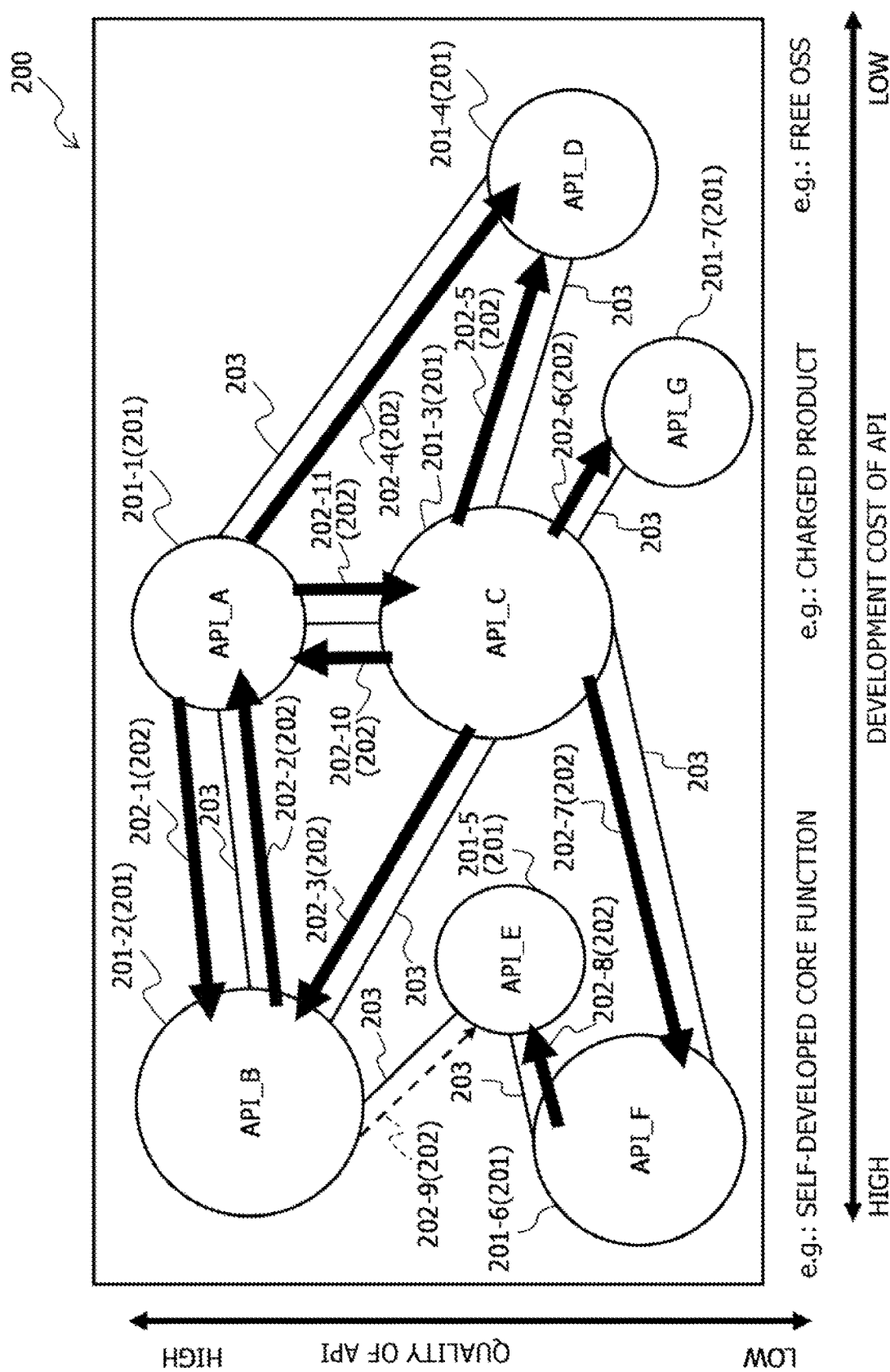
FIG. 7 is a diagram illustrating an output screen in the computer system as an example of the embodiment.

FIG. 7 is a diagram illustrating the output screen 200 in the computer system 1 as an example of the embodiment.

The output screen 200 reflects and represents information regarding use histories of APIs in the service 20 on a directed graph, and is mainly provided to a service administrator. The output screen 200 is generated corresponding to the service 20.

The output screen 200 illustrated in FIG. 7 includes a plurality of (seven in the example illustrated in FIG. 7) nodes 201-1 to 201-7 and a plurality of (eleven in the example illustrated in FIG. 7) edges 202-1 to 202-11. These nodes 201-1 to 201-7 and edges 202-1 to 202-11 constitute the directed graph. Furthermore, the output screen 200 illustrated in FIG. 7 also includes undirected edges 203 that connect the nodes 201 having relevance.

The nodes 201-1 to 201-7 represent APIs. In the example illustrated in FIG. 7, the seven nodes 201-1 to 201-7 are indicated in circles, and these nodes 201-1 to 201-7 correspond to seven APIs (API_A, API_B, API_C, API_D, API_E, API_F, and API_G) included in the service 20.

Hereinafter, in a case where the seven nodes 201-1 to 201-7 are not particularly distinguished, they are written as the nodes 201. Names of the nodes 201 are indicated in the nodes 201.

The edges 202-1 to 202-11 are directed line segments (arrows) that connect the nodes 201 having relevance. Hereinafter, in a case where the eleven edges 202-1 to 202-11 are not particularly distinguished, they are written as the edges 202.

The graph creation/display control unit 103 displays, on the output screen 200, the names of the APIs input from the GUI of the input screen as the names of the nodes 201. Furthermore, the presence or absence of relevance between the APIs is expressed as presence or absence of the edge between the nodes 201 on the output screen 200.

On the output screen 200, linkage between the APIs is visually represented by connecting the nodes 201 corresponding to the APIs related to each other, such as the APIs that exchange data, with the lines (the undirected edges 203 and the edges 202).

On the output screen 200, the undirected edges 203 and the edges 202 that connect the nodes 201 indicate that. API call has been repeated. In addition, it is indicated that the thicker the line thickness of the edge 202, the greater the number of times of repeat of the API call.

Furthermore, in a case where the number of times of repeat of the API call is equal to or smaller than a predetermined threshold, for example, in a case where the number of times of repeat of the API call is small, the graph creation/display control unit 103 sets, for example, a line type of the edge 202 to a broken line or a dotted line (see the edge 202-9).

Note that, in a case where the number of times of repeat of the API call is equal to or greater than a first threshold and equal to or smaller than a second threshold, for example, in a case where the number of times of repeat of the API call is not large or small, the graph creation/display control unit 103 may suppress illustration of the edge 202. With this configuration, the information to be displayed on the output screen 200 may be suppressed to make it easier to see.

Furthermore, the graph creation/display control unit 103 expresses the quality of the APIs input from the GUI of the input screen as positions of the nodes 201 in a vertical axis direction on the output screen 200. For example, an API with higher quality is arranged at an upper position in the output screen 200, and an API with lower quality is arranged at a lower position in the output screen 200.

For example, the graph creation/display control unit 103 displays the nodes 201 in the directed graph of the output screen 200 in a state according to the quality of the APIs corresponding to the nodes 201.

Note that the log collection unit 101 may collect information regarding an error detected by each API, and the log analysis unit 102 may obtain the number of error occurrences (error occurrence rate) for each API. Then, the graph creation/display control unit 103 may appropriately move positions of the nodes 201 in the output screen 200 according to the number of error occurrences (error occurrence rate).

Moreover, the graph creation/display control unit 103 expresses the development costs of the APIs input from the GUI of the input screen as positions of the nodes 201 in a horizontal axis direction on the output screen 200.

For example, an API with higher development cost is arranged at a leftward position in the output screen 200, and an API with lower development cost is arranged at a rightward position in the output screen 200. For example, since an API provided as free open source software (OSS) does not need a development cost, it is arranged at a right end position in the output screen 200. Furthermore, an API of a self-developed core function is arranged at a left side position in the output screen 200 as an API with a high development cost. An API which is a charged product may be arranged at a position near the center in a horizontal direction in the output screen 200, for example.

For example, the graph creation/display control unit 103 displays the nodes 201 in the directed graph of the output screen 200 in a state according to the development costs of the APIs corresponding to the nodes 201.

The graph creation/display control unit 103 reflects the node size information and the line type information notified from the log analysis unit 102 on the output screen 200 generated as described above.

For example, on the basis of the node size information notified from the log analysis unit 102 together with the API identification information, the graph creation/display control unit 103 changes the size of the node 201 of the API specified by the API identification information to the size indicated by the node size information.

Furthermore, on the basis of the line type information notified from the log analysis unit 102 together with the information for specifying the edge 202, the graph creation/display control unit 103 changes the line type of the edge 202 specified by the information for specifying the edge 202 to the line type indicated by the line type information.

The graph creation/display control unit 103 displays the output screen 200 reflecting the node size information and the line type information on the monitor 14a, thereby providing the node size information and the line type information to a service administrator.

(B) Operation

Figure 8:
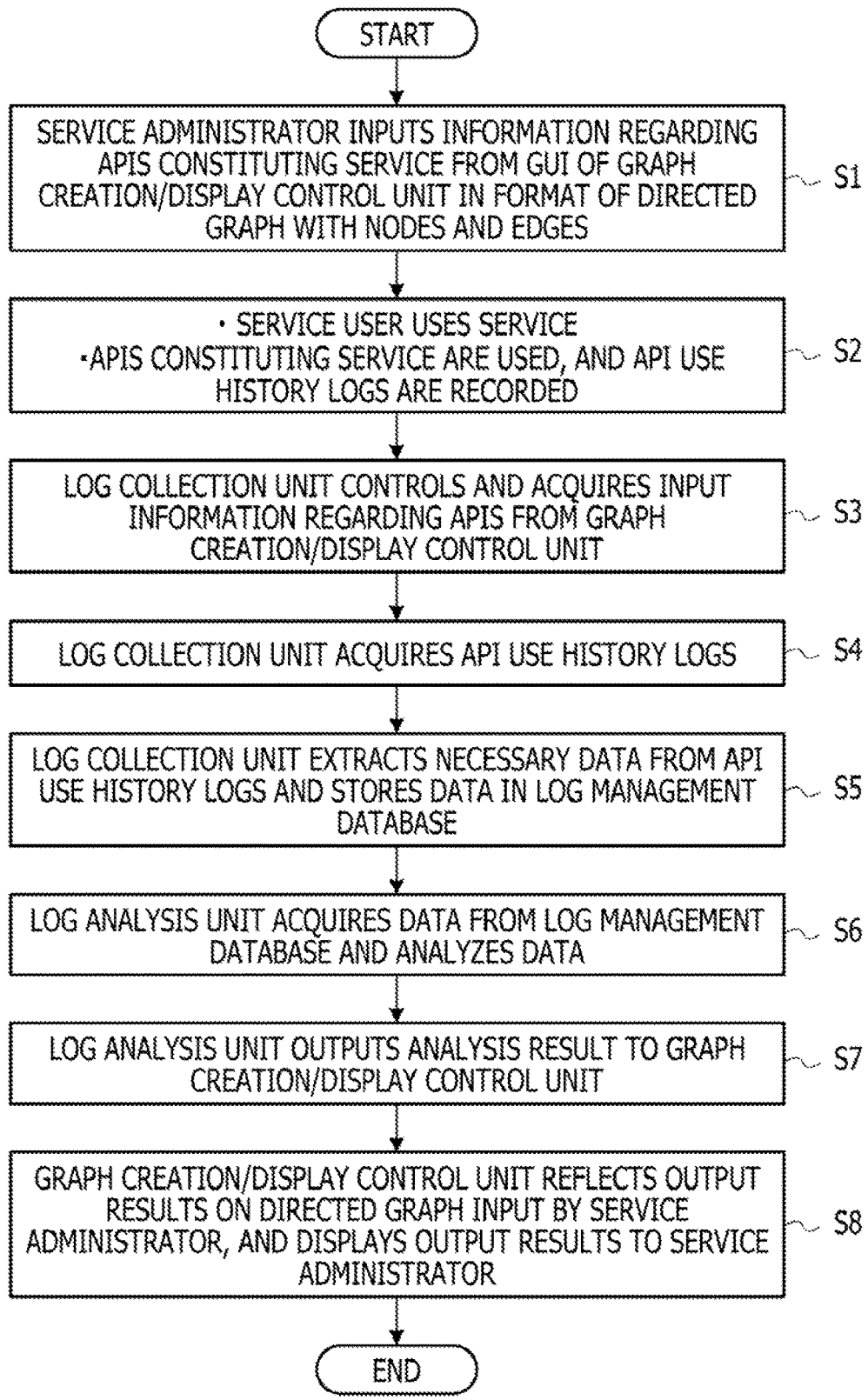
FIG. 8 is a flowchart for describing processing the computer system as an example of the embodiment.
Figure 9:
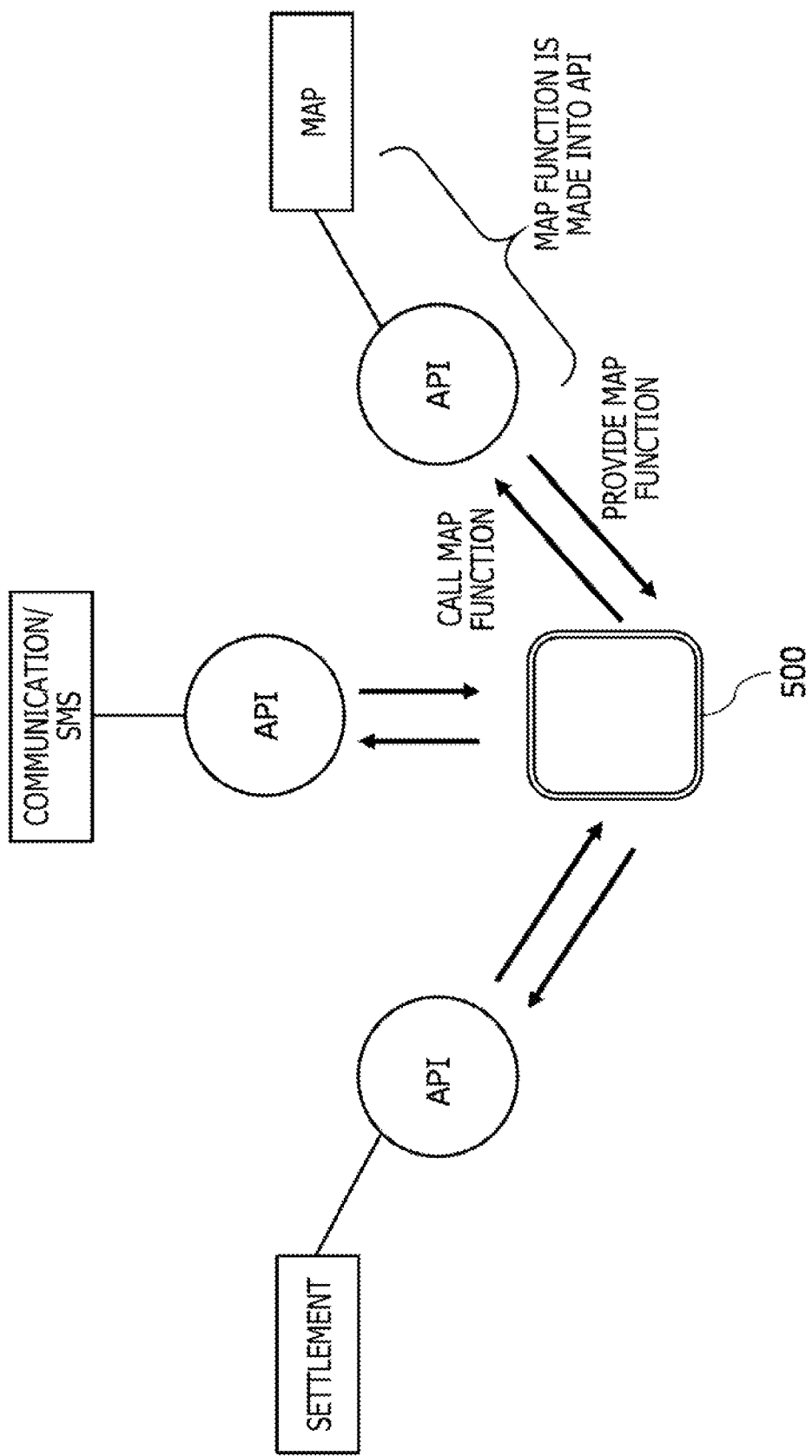
FIG. 9 is a diagram illustrating a configuration of a computer system configured by using an API.

Processing in the computer system 1 as an example of the embodiment configured as described above will be described with reference to a flowchart (Steps A1 to S8) illustrated in FIG. 8.

In Step S1, a service administrator uses the keyboard 15a and the mouse 15b to input information regarding APIs constituting the service 20 from a GUI of an input screen provided by the graph creation/display control unit 103. The service administrator inputs the information regarding the APIs in a format of a directed graph with the nodes 201 and the edges 202. The input information is stored in, for example, a predetermined storage area of the storage device 13.

In Step S2, a service user uses the service 20. At this time, the service providing servers 51 use the APIs constituting the service 20, and API use history logs are recorded in, for example, a memory or storage device (not illustrated) of the API providing server 51, while being included in a use history of the service 20.

In Step S3, the log collection unit 101 acquires the information regarding the APIs input in Step S1 from the graph creation/display control unit 103.

In Step S4, the log collection unit 101 acquires the API use history logs recorded in Step S2 from the service providing server 51 on the basis of the information regarding the APIs acquired in Step S3.

In Step S5, the log collection unit 101 extracts necessary data (for example, a service user ID and use time) from the API use history logs acquired in Step S4, and stores the data in the log management database 104.

In Step S6, the log analysis unit 102 acquires the data stored in Step S5 from the log management database 104 and analyzes the data.

For example, the log analysis unit 102 analyzes the number of times of use of an API (API use frequency) by the service user for each API.

Furthermore, the log analysis unit 102 analyzes order in which the service user used the APIs, and obtains, on the basis of the use order of the APIs, the total number of occurrences (number of calls) of each of API call patterns (execution order patterns) recognized to have continuity for all service users.

In Step S7, the log analysis unit 102 determines node size information on the basis of the API use frequency by the service user, and outputs the node size information to the graph creation/display control unit 103 together with information for specifying the API represented by the node size (API identification information).

Furthermore, the log analysis unit 102 obtains the total number of occurrences (number of calls) of each of the API call patterns recognized to have continuity for all service users. Then, the log analysis unit 102 determines a line type (display form) of the edge 202 according to the number of calls between the APIs having continuity.

The log analysis unit 102 outputs, to the graph creation/display control unit 103, the determined line type information of the edge 202 together with information for specifying the edge 202 represented by the line type information (for example, API identification information of APIs that are a start point and an end point of the edge 202).

In Step S8, the graph creation/display control unit 103 reflects the node size information and line type information output from the log analysis unit 102 on the directed graph of the output screen 200, outputs them to the monitor 14a, and presents them to the service administrator. Thereafter, the processing ends.

(C) Effects

Thus, according to the computer system 1 as an embodiment of the present invention, the log analysis unit 102 analyzes the number of times of use of an API (API use frequency) by a service user for each API, determines the size (node size) of the node 201 representing the P1 according to the API use frequency, and notifies the graph creation/display control unit 103 of the size.

The graph creation/display control unit 103 displays the node 201 corresponding to the API with the node size notified from the log analysis unit 102 in a directed graph of the output screen 200.

With this configuration, on the output screen 200, use states (the numbers of times of use) of a plurality of APIs used in the service 20 are visualized, and a service administrator may easily grasp the use states of the APIs, which is highly convenient. For example, it is possible to take improvement measures at an early stage for APIs that are used infrequently.

For example, on the output screen 200 illustrated in FIG. 7, it is possible to easily grasp that the numbers of times of use of API_E and API_G are small, and it is possible to work on improvement at an early stage.

Here, it is considered to be a problem that the number of times of use of the API_E is small despite a high development cost. As a measure, it is possible to take measures at an early stage, such as improving quality of the API_E or stopping self-development and replacing the API_E with OSS having the same function.

Although the number of times of use of the API_G is small similarly to the API_E, a development cost of the API_G is originally low. Thus, it may be determined that an influence on the service 20 is small. Here, however, when a policy of increasing frequency of use of the API_G is adopted, measures such as replacement to a rich product having the same function or self-development of the API_G may be taken at an early stage.

Furthermore, the log analysis unit 102 obtains, on the basis of use order of each API, the total number of occurrences (number of calls) of each of API call patterns (execution order patterns) recognized to have continuity for all service users. Then, the log analysis unit 102 creates line type information for changing a line type of the edge 202 according to the analyzed number of calls between the APIs having continuity.

The graph creation/display control unit 103 displays the edges 202 between the nodes 201 with the line type information notified from the log analysis unit 102 in the directed graph of the output screen 200.

With this configuration, by looking at the edges 202 between the APIs on the output screen 200, the service administrator may easily grasp the use states of the APIs in what order the service users are using the APIs, which is highly convenient.

For example, on the output screen 200 illustrated in FIG. 7, it may be seen that there are extremely few people who use the APIs in the order of API_B→API_E, even though the API_B and the API_E are linked APIs. The service administrator may infer that there is a bottleneck here in difficulty of use for the service users.

On the other hand, since the number of times another API is continuously used after the API_C is large, it may be easily grasped that the API_C plays a role like a hub. Therefore, it is possible to analyze that the number of times of use of the API_E is expected to increase by improving the service 20 so that the API_C and the API_E are linked.

(D) Others

The disclosed technique is not limited to the embodiment described above, and various modifications may be made to be implemented without departing from the gist of the present embodiment. Each configuration and each processing of the present embodiment may be selected or omitted as needed or may be appropriately combined.

For example, in the embodiment described above, the log analysis unit 102 changes the size of the node 201 corresponding to the API in the directed graph of the output screen 200 according to the number of times of use of the API. However, the embodiment is not limited to this.

For example, the color, shape, pattern, or the like of the node 201 may be displayed differently according to the number of times of use of the API, and various modifications may be made to be implemented. The color may include saturation or brightness.

Furthermore, in the embodiment described above, according to the number of times of execution of two APIs continuously executed in the execution order, the log analysis unit 102 changes line type so that lines of the edges 202 between the nodes 201 corresponding to the APIs in the directed graph of the output screen 200 are thickened. However, the embodiment is not limited to this.

For example, the color, shape, pattern, or the like of the nodes 201 may be displayed differently according to the number of times of execution of the two APIs continuously executed in the execution order, and various modifications may be made to be implemented. The color may include saturation or brightness.

The graph creation/display control unit 103 displays the nodes 201 in the directed graph of the output screen 200 at positions according to the quality or development costs of the APIs corresponding to the nodes 201. However, the embodiment is not limited to this. The graph creation/display control unit 103 may display the color, shape, pattern, or the like of the nodes 201 differently according to the quality or development costs of the APIs, and various modifications may be made to be implemented.

Furthermore, the present embodiment may be implemented and manufactured by those skilled in the art according to the disclosure described above.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
a memory; and
a processor coupled to the memory, the processor being configured to perform processing, the processing including:
   executing a display form determination processing that includes
      extracting, for each application programing interface (API) of a plurality of application programing interfaces (APIs) used by a computer service, from use history data of the computer service a number of times of execution of the API, and
      determining, for each API of the plurality of APIs, a display form for the API according to the extracted number of times of execution of the API; and
   executing a display control processing that includes displaying, in a directed graph that represents a plurality of nodes each of which indicates a corresponding API of the plurality of APIs, each node of the plurality of nodes based on the determined display form for the corresponding API of the node.

2. The information processing apparatus according to claim 1, wherein
the display form determination processing is configured to determine, according to the number of times of execution of two APIs continuously executed in the execution order among the plurality of APIs, a display form of a directed line segment that connects, on the basis of the use history data, between two nodes that correspond to the two APIs in the directed graph, and
the display control unit displays the directed line segment in the determined display form in the directed graph.

3. The information processing apparatus according to claim 1, wherein the display control processing is configured to display, in the directed graph, the nodes in a state according to quality of the APIs that correspond to the nodes.

4. The information processing apparatus according to claim 1, wherein the display control processing is configured to display, in the directed graph, the nodes in a state according to development costs of the APIs that correspond to the nodes.

5. A non-transitory computer-readable storage medium storing an API use history display program that causes a processor of an information processing apparatus connected to a computer service to execute processing comprising:
   extracting, for each application programing interface (API) of a plurality of application programing interfaces (APIs) used by the computer service, from use history data of the computer service, a number of times of execution of the API;
   determining, for each API of the plurality of APIs, a display form for the API according to the extracted number of times of execution of the API; and
   displaying, in a directed graph that represents a plurality of nodes each of which indicates a corresponding API of the plurality of APIs, each node of the plurality of nodes based on the determined display form for the corresponding API of the node.

6. The API use history display program according to claim 5, causing the processor to execute processing comprising:
   determining, according to the number of times of execution of two APIs continuously executed in the execution order among the plurality of APIs, a display form of a directed line segment that connects, on the basis of the use history data, between two nodes that correspond to the two APIs in the directed graph; and
   displaying the directed line segment in the determined display form in the directed graph.

7. The API use history display program according to claim 5, causing the processor to execute processing comprising displaying, in the directed graph, the nodes in a state according to quality of the APIs that correspond to the nodes.

8. The API use history display program according to claim 5, causing the processor to execute processing comprising displaying, in the directed graph, the nodes in a state according to development costs of the APIs that correspond to the nodes.

* * * * *